(12) United States Patent
Nichols

(10) Patent No.: US 9,456,591 B2
(45) Date of Patent: Oct. 4, 2016

(54) FISHING LURE RESEMBLING A SHRIMP

(71) Applicant: D.O.A., Inc., Stuart, FL (US)

(72) Inventor: Mark S. Nichols, Stuart, FL (US)

(73) Assignee: D.O.A., INC., Stuart, FL (US)

( * ) Notice: Subject to any disclaimer, the term of this patent is extended or adjusted under 35 U.S.C. 154(b) by 0 days.

(21) Appl. No.: 13/772,026

(22) Filed: Feb. 20, 2013

(65) Prior Publication Data

US 2014/0230310 A1   Aug. 21, 2014

(51) Int. Cl.
*A01K 85/00* (2006.01)
*A01K 85/02* (2006.01)
*A01K 85/16* (2006.01)

(52) U.S. Cl.
CPC ............ *A01K 85/02* (2013.01); *A01K 85/16* (2013.01)

(58) Field of Classification Search
CPC ...... A01K 85/00; A01K 83/06; A01K 83/00; A01K 85/08; A01K 99/00
USPC ............ 43/42.1, 42.22, 42.24, 42.26, 42.28, 43/42.36, 42.38, 42.37, 42.39
See application file for complete search history.

(56) References Cited

U.S. PATENT DOCUMENTS

| | | | | | |
|---|---|---|---|---|---|
| 2,089,605 | A | * | 8/1937 | Hardy | A01K 85/16 43/42.26 |
| 4,771,567 | A | * | 9/1988 | Cannon | 43/42.26 |
| 5,228,230 | A | * | 7/1993 | Vaught | 43/42.26 |
| 5,276,993 | A | * | 1/1994 | Rosenblatt | 43/42.06 |
| 5,806,234 | A | | 9/1998 | Nichols | |
| D498,813 | S | | 11/2004 | Nichols | |
| 6,922,939 | B2 | * | 8/2005 | Moorhouse | 43/42.35 |
| 7,185,457 | B2 | | 3/2007 | Nichols | |
| 7,263,798 | B2 | | 9/2007 | Nichols | |
| 7,827,731 | B2 | * | 11/2010 | Gibson | 43/42.39 |
| 2003/0074829 | A1 | * | 4/2003 | Brinkman | 43/42.36 |
| 2005/0172538 | A1 | * | 8/2005 | Brinkman | 43/42.36 |
| 2005/0204607 | A1 | | 9/2005 | Nichols | |
| 2006/0143972 | A1 | | 7/2006 | Nichols | |
| 2008/0072473 | A1 | * | 3/2008 | Hogan | 43/42.41 |
| 2011/0010983 | A1 | * | 1/2011 | Briccetti et al. | 43/17.6 |

* cited by examiner

*Primary Examiner* — David Parsley
*Assistant Examiner* — George Andonyan
(74) *Attorney, Agent, or Firm* — Akerman LLP; Michael K. Dixon

(57) ABSTRACT

A fishing lure having an internal cavity for containing a hook and a weight attached to the hook such that the weight is coupled to the hook closer to a throat of the hook than to a line receiving portion of the hook. The combined hook and weight resist being pulled through a shank containing region of lure. The weight may be positioned in a midsection of the lure enabling the lure to maintain a relatively level attitude in the water while being pulled through the water.

18 Claims, 11 Drawing Sheets

FISHING LURE RESEMBLING A SHRIMP

FIELD OF THE INVENTION

This invention is directed generally to fishing lures, and more specifically to soft bodied fishing lures.

BACKGROUND OF THE INVENTION

Artificial lures have been used for many years to catch fish in rivers, lakes, estuaries, bays, and oceans. Artificial lures typically are formed from either hard or soft materials. Hard bodied lures commonly have hooks attached to an outer surface of the lure, while soft bodied lures often have hooks completely concealed within the lure or at least partially concealed in cavities in the lures. Because of the rigidity inherent in hard bodied lures, the hooks are easily attached to the lures such as by screwing an attachment mechanism into the lure. Fish have been known to pull hooks from hard bodied lures, but this is not common. Instead, hooks often straighten or are pulled out of a fish's mouth before being pulled from a lure.

In contrast, soft bodied lures face a much larger challenge in keeping a hook in the body of lure. Most soft bodied lures have one or more hooks inserted into the body such that an eye of the hook protrudes from the body. The hook point may either be buried in the lure body, such as commonly found with a weedless configuration such as a Texas rigged plastic worm or other such lure, or may protrude from the lure. Often times, a soft bodied lure does not have a slot or cavity into which a hook may be inserted. Rather, a hook may be inserted into the lure body by inserting the point of the hook and forcing the point through the body until it protrudes out of the lure body. There exists numerous ways of positioning a hook in a soft bodied lure, which are known to those of ordinary skill in the art and not discussed here.

Examples of particular soft bodied lure are shown in FIGS. 1 and 2. FIGS. 1 and 2 shows cross-sections of soft bodied lures resembling a shrimp. Each lure includes a cavity for containing a hook. The cavity generally follows the shape of the hook and enables a point of the hook to protrude through a top surface of the lure while an eye of the hook protrudes through the tip of the lure.

During use, the lure is pulled through the water by a line attached to the eye of the hook. The shrimp remains relatively rigid during use. In addition, the hook containing chamber with an opening in the top surface of the body of the lure significantly impacts durability of the lure. Thus, a need exists for a more robust lure capable of withstanding a tough environment.

SUMMARY OF THE INVENTION

This invention is directed to a lure having a combined hook and weight for resisting the hook from being pulled out of a body of the lure when the hook is pulled at a line receiving portion of the hook, such as when the lure is pulled by a fishing line attached to the lure. The lure may be formed from a body having one or more hook receiving cavities in a midsection of the body. The hook receiving cavity may be sized to contain the hook and weight and may be accessible through an opening in a surface of the body. The hook receiving cavity may be formed from a weight containing cavity for containing a weight attached to a hook and a shank containing region for containing a shank of the hook. The hook receiving cavity may also be formed such that a portion of the hook contacts an inner surface of the hook receiving cavity thereby resisting the hook from being pulled from the body when the hook is pulled from the line receiving portion of the body. The body may configured as a shrimp or other crustaceans.

The lure may be formed from an elongated body configured to resemble a shrimp and having at least one hook receiving cavity in a midsection of the body. The body may also include a head, a tail, and a plurality of legs extending from the head. The hook receiving cavity may be defined by a first laterally extending sidewall, extending in a direction from the head towards the tail, forming part of a first side of the elongated body of the lure and may be formed from a second laterally extending sidewall, extending in a direction from the head towards the tail, forming part of a second side of the elongated body of the lure. An outer surface of the first sidewall may face in a opposite direction from an outer surface of the second sidewall. The hook receiving cavity may be further defined by a bottomwall extending in a direction from head to tail. The hook receiving cavity may include a bottom-facing, elongated opening at least partially in the midsection of the body. The bottom-facing, elongated opening may extend from a rearward edge of the bottomwall defining a portion of the hook receiving cavity to tailwardmost point of the bottom-facing, elongated opening.

The lure may include a hook with a weight coupled to the hook along a shank of the hook such that the weight is positioned along at least a portion of the shank of the hook. The hook may be positioned in the hook receiving cavity such that at least a portion of the weight contacts inner surfaces of the hook receiving cavity thereby resisting the hook from being pulled from the body when the hook is pulled at a line receiving portion of the hook. The weight coupled to the hook may be positioned in the hook receiving cavity in the body such that a portion of the hook receiving cavity remains unfilled when the weight is positioned within the hook receiving cavity. A forward endwall may form a portion of the hook receiving cavity and may prevent the weight from being pulled into the body toward the head of the lure.

The lure may include a support backbone of the body having a generally consistent thickness throughout the head and midsection of the body. The support backbone of the body may extend from the head to the tail. The support backbone may have sufficient rigidity to support the tail when the lure is picked up by the head, but not strong enough to support the head when the lure is picked up by the tail. As such, the lure is sufficiently pliable to enable action during use to resemble natural shrimp.

An advantage of this invention is that the lure is sufficiently pliable to enable action during use to resemble natural shrimp.

Another advantage of this invention is that the lure has a mass midpoint substantially within a midsection of a body of the lure, enabling the lure to maintain a relatively upright position when pulled through the water.

Yet another advantage of this invention is that the weight prevents the hook from being foul hooked into the body.

Still another advantage of this invention is that the base of the weight enhances stability of lure body, thereby assisting to limit the susceptibility of the lure to roll onto its side when pulled through the water by a line receiving portion of the hook.

These and other embodiments will be described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF PREFERRED EMBODIMENTS

Figure 1:
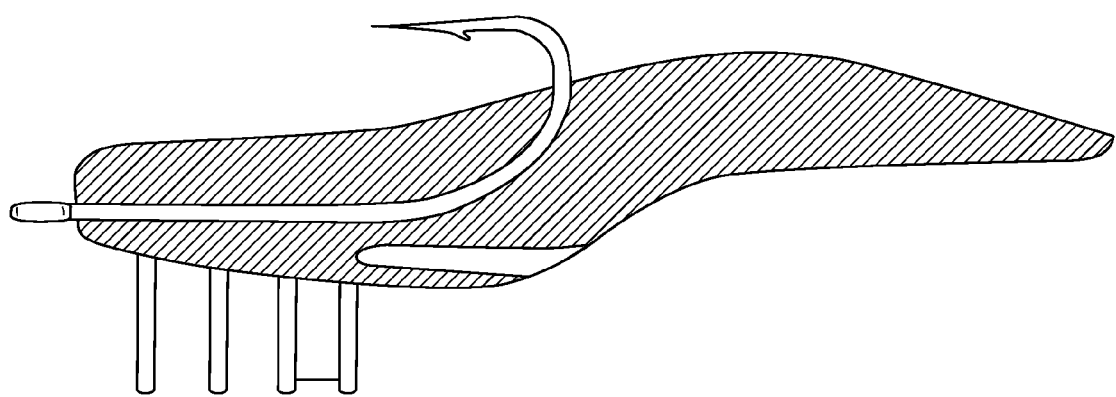
FIG. 1 is a cross-sectional view of a fishing lure of the prior art.
Figure 2:
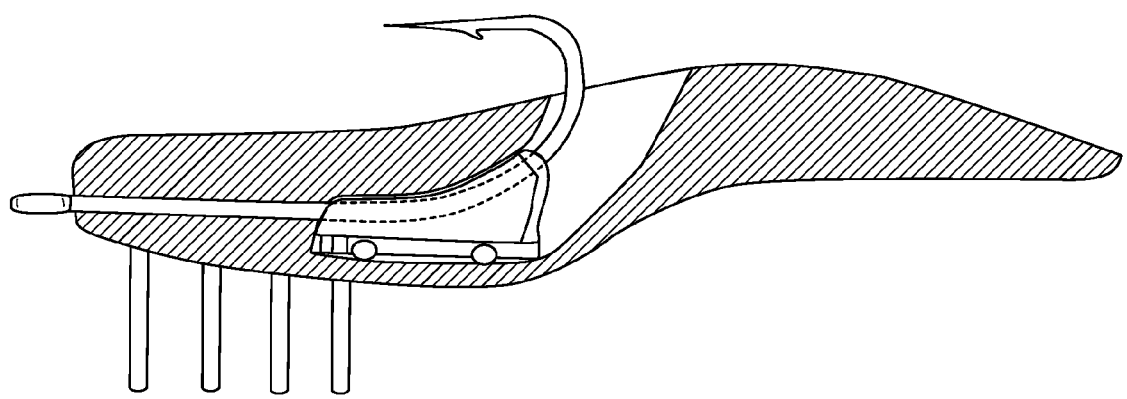
FIG. 2 is a cross-sectional view of another fishing lure of the prior art.
Figure 3:
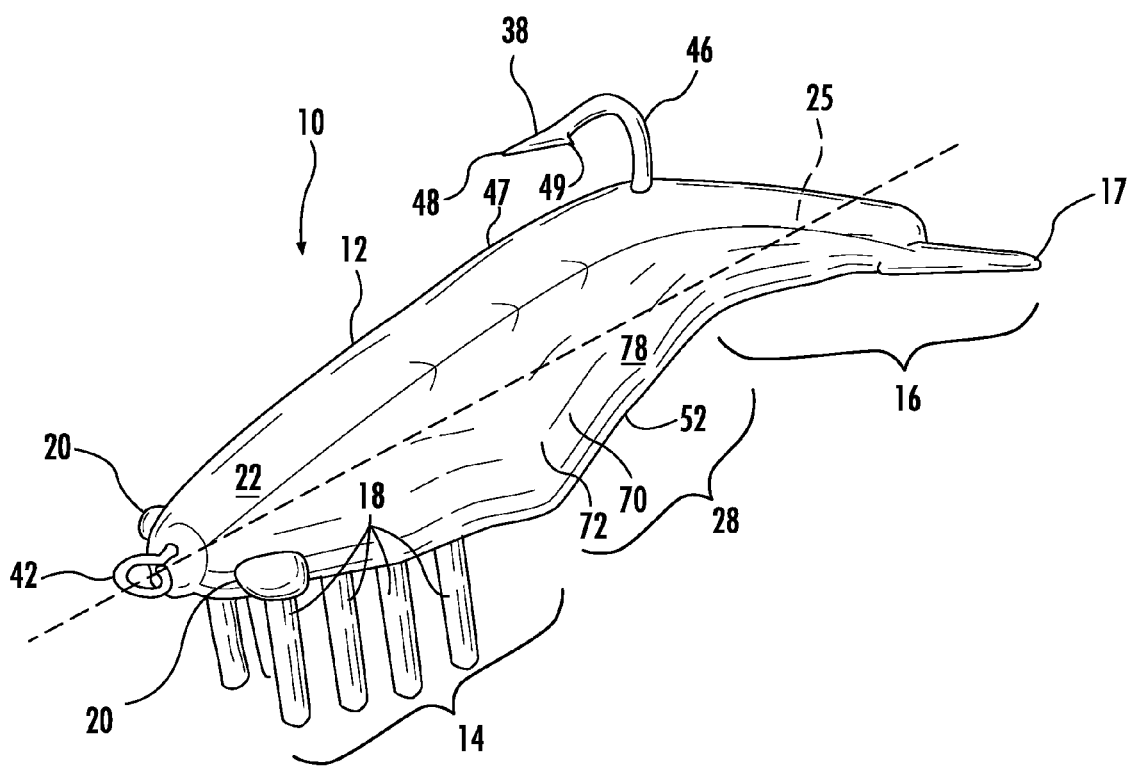
FIG. 3 is a perspective view of fishing lure according to an embodiment of the invention.

As shown in FIGS. 3-11, this invention is directed to a fishing lure 10 that simulates a natural baitfish or crustacean when suspended in water. In at least one embodiment, the fishing lure 10 may be an imitation of a shrimp having a configuration enabling the lure to maintain an attitude, or position, of a living shrimp while pulled through the water. As such, a longitudinal axis 25, as shown in FIG. 3, is generally horizontal. The fishing lure 10 may include a hook and weight combination enabling the hook to remain in the body even as the hook is pulled from a line receiving portion of the hook. Thus, the hook remains in position while being cast repeatedly and even after numerous fish have been caught using the lure body.

Figure 7:
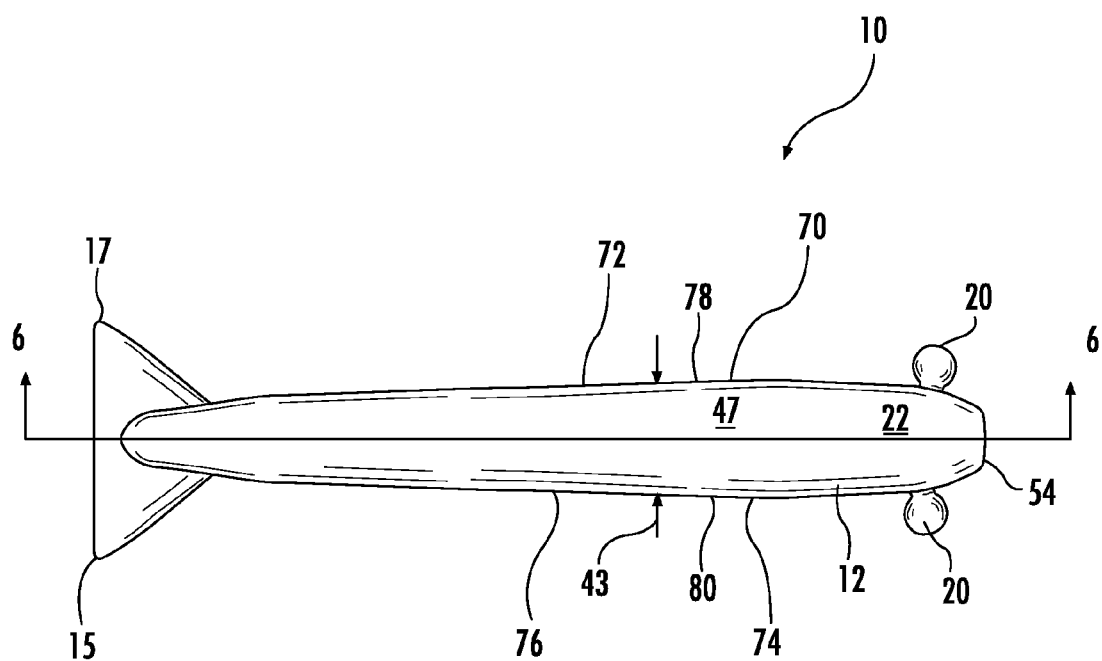
FIG. 7 is a top view of the fishing lure shown in FIG. 3.
Figure 8:
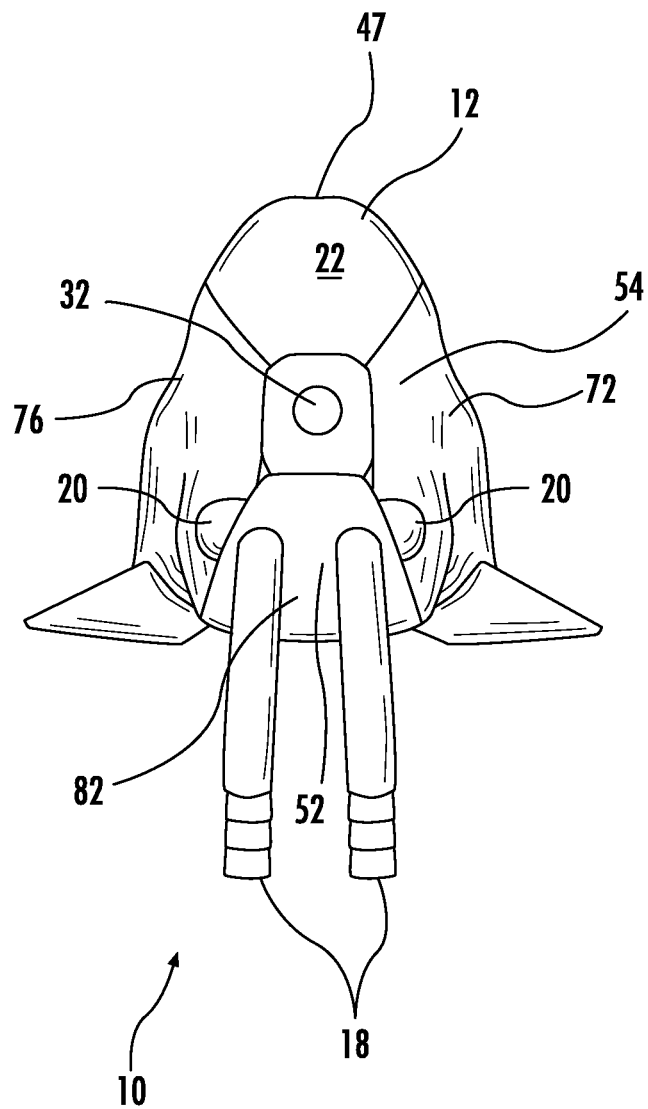
FIG. 8 is a front view of the fishing lure shown in FIG. 3.
Figure 9:
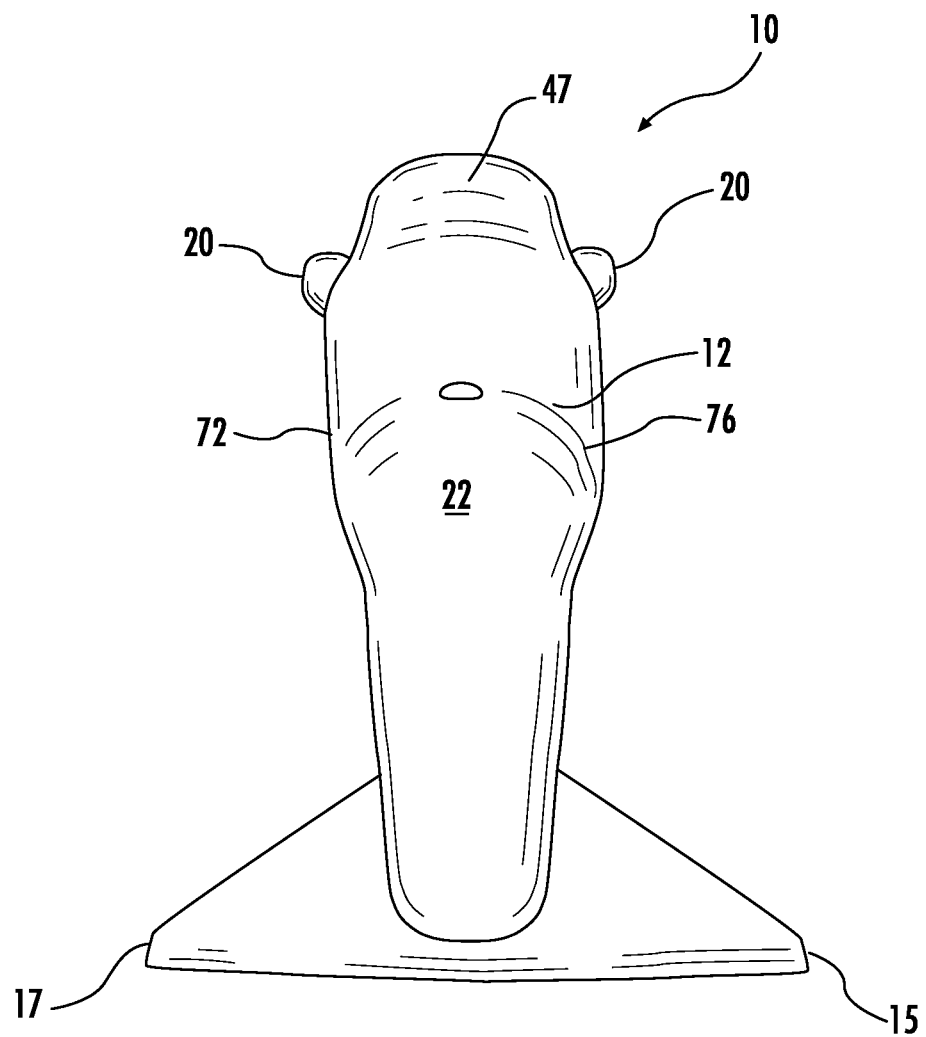
FIG. 9 is a rear view of the fishing lure shown in FIG. 3.
Figure 10:
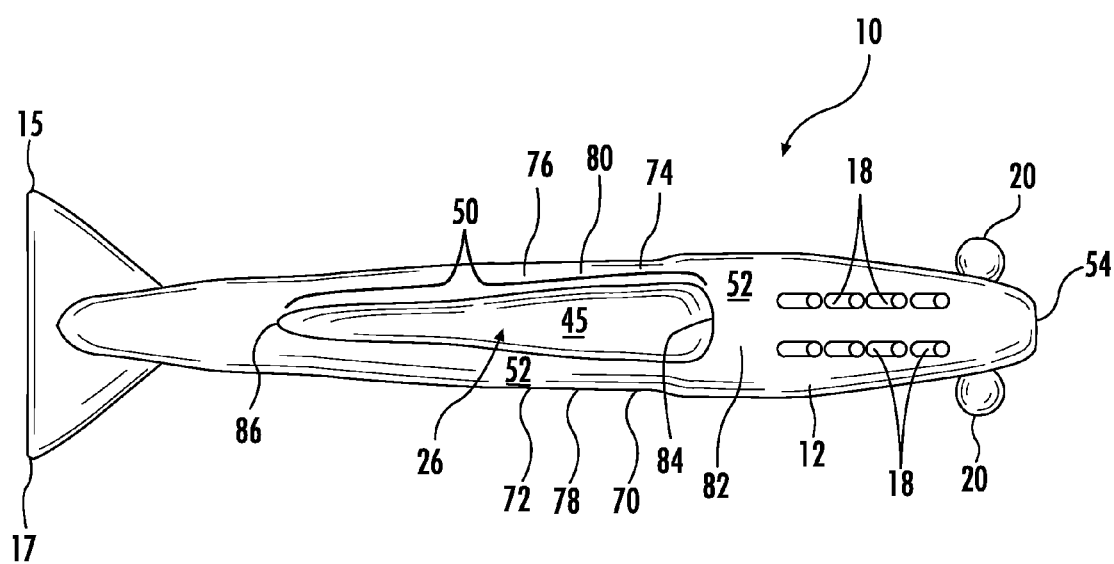
FIG. 10 is a bottom view of the fishing lure shown in FIG. 3.

The fishing lure 10 may be formed from a body 12 having a head 14, a tail 16, and a plurality of legs 18 extending from the head 14. The tail 16 may be a flat tail, as shown in FIGS. 3 and 7, a paddle tail, a curly tail, or other appropriately shaped tail simulating a shrimp or other baitfish. The tail 16 may also be generally triangularly shaped having first and second distal tips 15, 17. The head 14 may resemble a shrimp head or that of a fish. The plurality of legs 18 may consist of two or more legs, and may be formed from eights legs. The legs 18 may extend from the body in a parallel or nonparallel manner. In at least one embodiment, the head 14 may also include a plurality of eyes 20 extending from a side surface 22 of the head 14. The eyes 20 may each be spherically shaped members attached to longitudinal supports extending from the body 12 or formed from another appropriate shape. The eyes 20 may have a color different than other portions of the body 12. The body may be formed from materials, including, but not limited to, plastic, rubber, and other appropriate materials. In at least one embodiment, the materials may be flexible.

Figure 6:
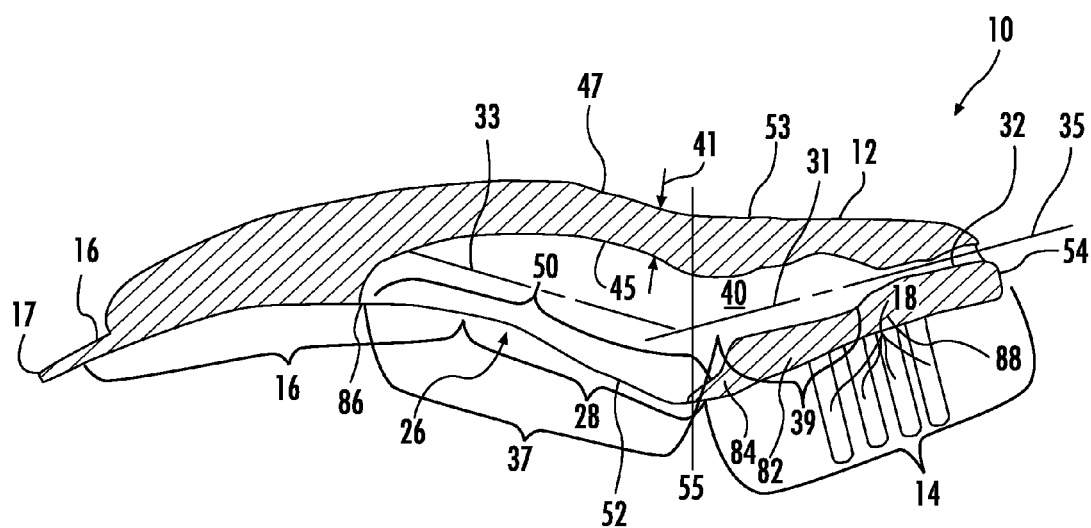
FIG. 6 is a cross-section of the fishing lure of FIG. 3 taken along section line 6-6 shown in FIG. 7 with the hook and weight removed.

The body 12 may also include a hook receiving cavity 26, as shown in FIG. 6. The hook receiving cavity 26 may be located generally in a midsection 28 of the body 12. The hook receiving cavity 26 may be configured to receive a weight 34. As shown in FIG. 6, the hook receiving cavity 26 may have an elongated cross-section, as shown taken at section line 6-6 in FIG. 7. The hook receiving cavity 26 may have a weight receiving pocket 39 and a rear open region 37. The hook receiving cavity 26 may occupy a large portion of the body 12 such that a support backbone 53 supports the head 14 and tail 16. In one embodiment, the support backbone 53 may be the only solid continuous portion of material in the body 12 extending between the head 14 and the tail 16. A cross-sectional area of the hook receiving cavity 26 taken at an intersection 55 between the head 14 and the midsection 28, shows the support backbone 53, the first laterally extending sidewall 70 and the second laterally extending sidewall 74. The support backbone 53 may be rigid enough to support the tail 16 when the lure 10 is picked up by the head 14, but not strong enough to support the head 14 when the lure 10 is picked up by the tail 16. As such, the lure 10 is sufficiently pliable to enable action during use to resemble natural shrimp. The support backbone 53 may have a thickness 41 from a top surface 47 to a bottom backbone surface 45 that is less than ⅓ of a distance from the top surface 47 to the bottom surface 52. The support backbone 53 may have a thickness 41 throughout the midsection 28 of the body 12 that is generally equal to a width 43 of the support backbone 53. The width 43 of the support backbone 53 may be generally consistent throughout the length of the body 12 from the tip 54 of the head 14 to a distal end of the tail 16. In addition, the thickness 41 of the support back bone 53 may be generally consistent throughout the midsection 28 of the body 12 to the tip 54 of the head 14.

The hook receiving cavity 26 may be defined by a first laterally extending sidewall 70 extending in a direction from the head 14 towards the tail 16. The first laterally extending sidewall 70 may form part of a first side 72 of the elongated body 12 of the lure 10. A second laterally extending sidewall 74 may extend in a direction from the head 14 towards the tail 16 forming part of a second side 76 of the elongated body 12 of the lure 10. An outer surface 78 of the first sidewall 70 may face in a opposite direction from an outer surface 80 of the second sidewall 74.

In at least one embodiment, the hook receiving cavity 26 may have only a single bottom-facing, elongated opening 50 through an outer surface of the body 12. As shown in FIG. 6, the bottom-facing, elongated opening 50 may be positioned on a bottom surface 52 of the body 12. The hook receiving cavity 26 may be further defined by a bottomwall 82 extending in a direction from the head 14 to the tail 16. The bottom-facing, elongated opening 50 may be at least partially in the head 14, in the midsection 28 of the body, and in the tail 16. The bottom-facing, elongated opening 50 may extend from a rearward edge 84 of the bottomwall 82 defining a portion of the hook receiving cavity 26 to a tailwardmost point 86 of the bottom-facing, elongated opening 50.

The first and second sidewalls 70, 74 forming the hook receiving cavity 26 may be flexible. In fact, the first and second sidewalls 70, 74 forming the hook receiving cavity 26 may be flimsy such that a thickness of each sidewall 70, 74 is less than a width of the bottom-facing, elongated opening 50 of the hook receiving cavity 26. In at least one embodiment, the combined thickness of the first and second sidewalls 70, 74 may be less than a width of the bottom-facing, elongated opening 50 of the hook receiving cavity 26. The first and second sidewalls 70, 74 may have a thickness generally equivalent to a thickness of the bottomwall 82.

Inner surfaces 40 of the hook receiving cavity 26 may prevent the hook 38 from being pulled from the body 12 when the hook 38 is pulled at a line receiving portion 42 of the hook 38. A forward endwall 88 may be form a portion of the hook receiving cavity 26 to prevent the weight 34 from being pulled into the body 12 toward the head 14 of the lure 10. A shank containing cavity 32 may extend between the hook receiving cavity 26 and a tip 54 of the head 14 of the lure 12 and may be sized to allow a shank 36 of the hook 38 to be inserted into the shank containing cavity 32 but to restrict the weight 34 from being inserted into the shank containing cavity 32.

The hook receiving cavity 26 may be formed from a weight receiving pocket 39 and an open cavity 37 positioned rearward of the weight receiving pocket 39. The weight receiving pocket 39 may be generally aligned with the shank containing region 32. Both the weight receiving pocket 39 and the shank containing region 32 may be aligned with a longitudinal axis 31 of the head 14. The open cavity 37 portion of the hook receiving cavity 26 may be positioned in the midsection 28 of the body 12 and may extend into the tail section 16. The volume of the open cavity 37 may be at least twice the volume of the weight receiving pocket 39 and may extend for about twice a length of the weight receiving pocket 39. The open cavity 37 may also have a height greater than about 1.5 times a height of the weight receiving pocket 39. A longitudinal axis 33 of the open cavity 37 may be nonparallel and nonorthogonal to the longitudinal axis 31 of the weight receiving pocket 39.

Figure 4:
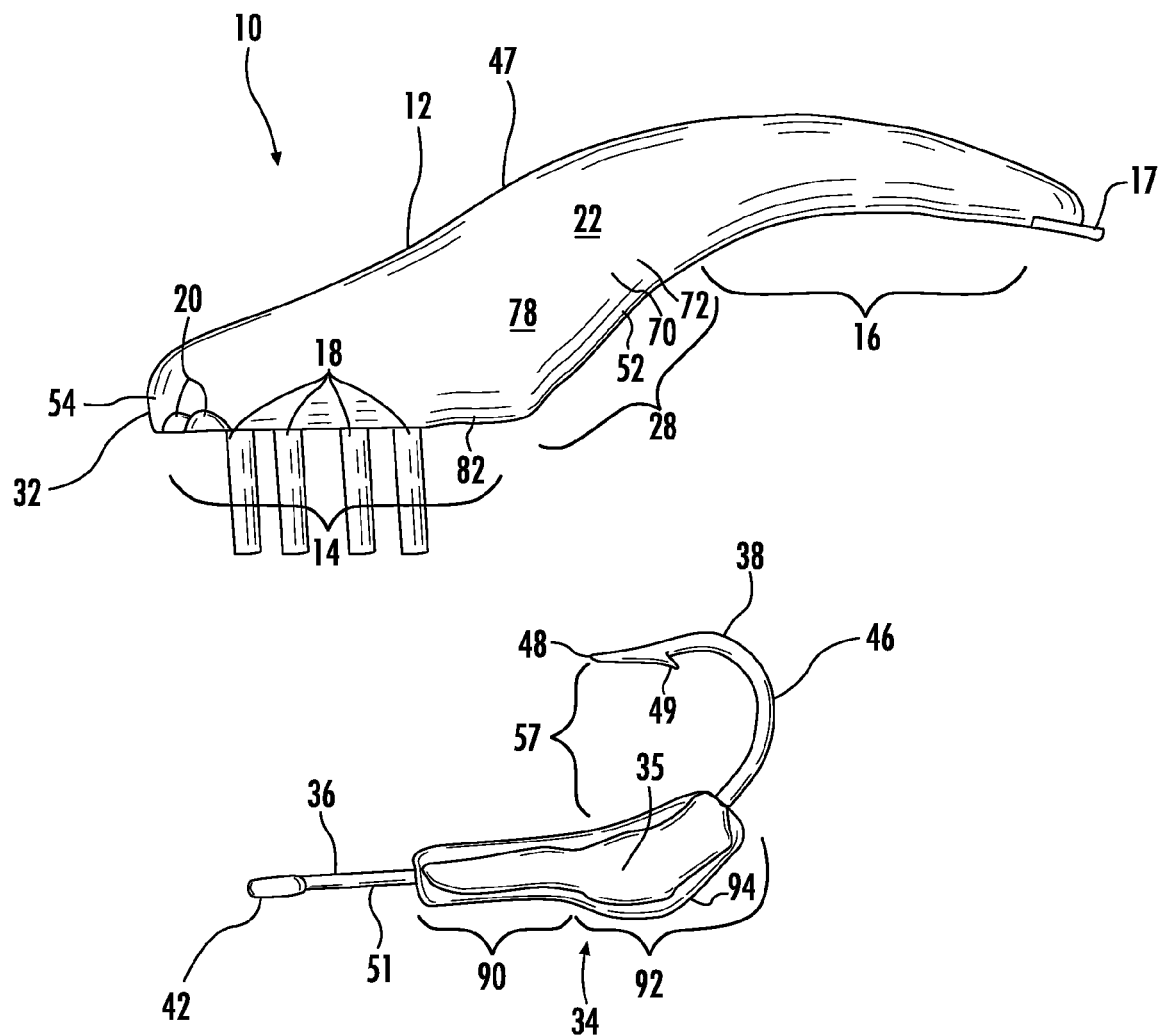
FIG. 4 is an exploded perspective view of the fishing lure shown in FIG. 3.
Figure 5:
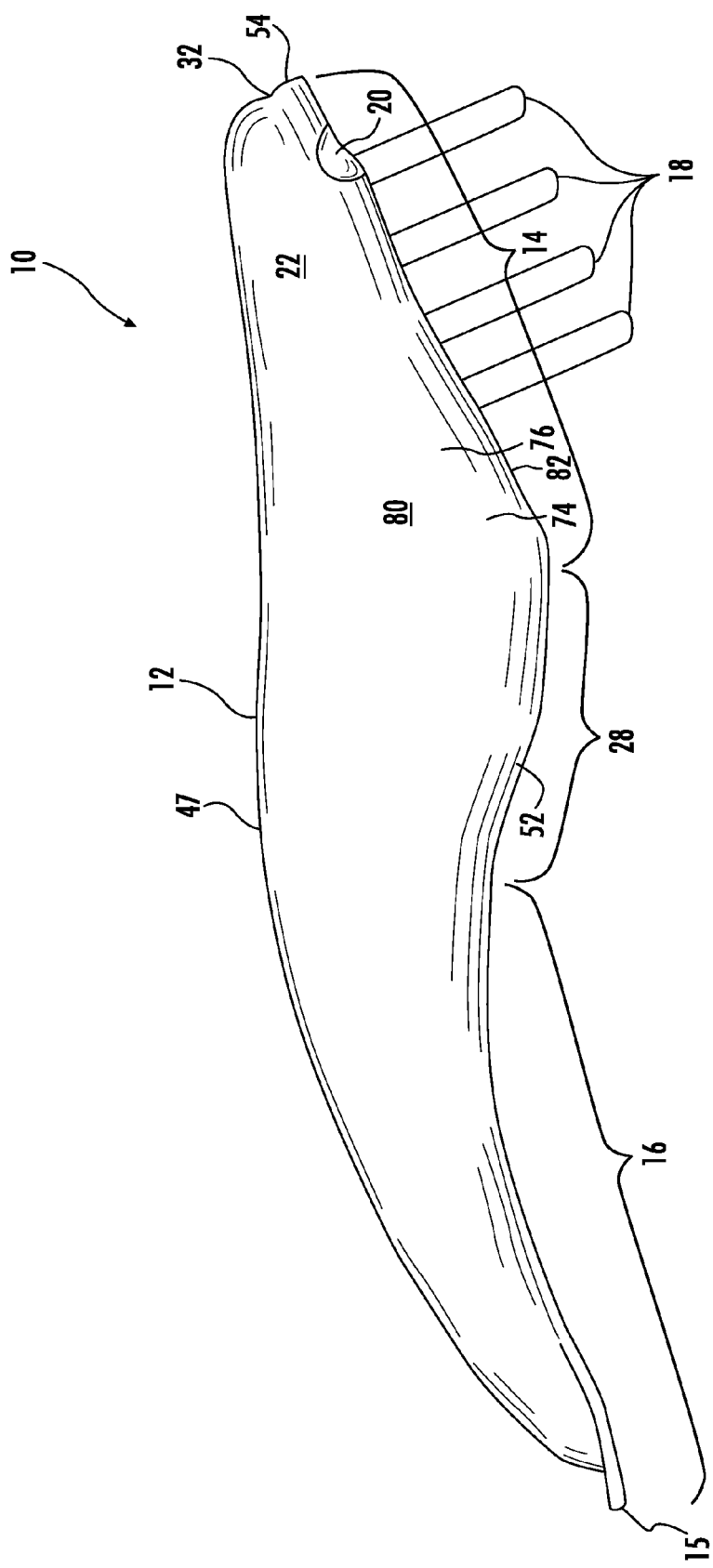
FIG. 5 is a side view of the fishing lure shown in FIG. 3.
Figure 11:
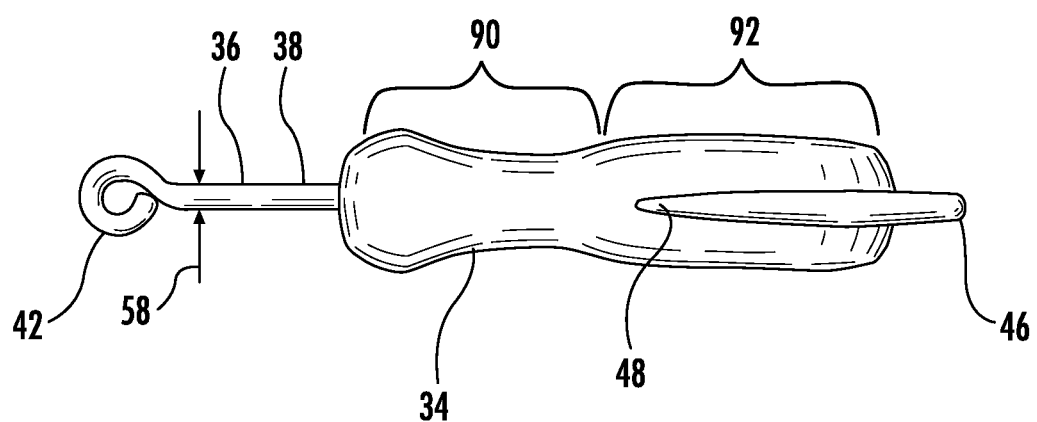
FIG. 11 is a front view of a hook of the fishing lure.

As shown in FIGS. 3, 4 and 11, the lure 10 may also include the hook 38 and a weight 34 attached to the hook 38. The hook 38 may be formed from a line receiving portion 42, a shank 36, a bend 46, a throat 57, and a point 48, and in some embodiments, may also include a barb 49 on the point 48 and one or more barbs 51 on the shank 36. Some embodiments of the hook 38 may include enlarged portions of the bend 46 relative to the shank 36, and other embodiments, may have the shank 36 forming a significant portion of the hook 38. In at least one embodiment, the line receiving portion 42 is an eye formed from a substantially circular portion of the shank 36. The hook 38 may have a weight 34 coupled to the hook 38 along a shank 36 of the hook 38 such that the weight 34 is positioned along at least a portion of the shank 36 of the hook 38. At least a portion of the weight 34 may be coupled to the bend 46 of the hook 38. The hook 38 may be positioned in the hook receiving cavity 26 such that at least a portion of the weight 34 contacts inner surfaces 40 of the hook receiving cavity 26 thereby creating resistance to prevent the hook 38 from being pulled from the body 12 when the hook 38 is pulled at a line receiving portion 42 of the hook 38. The weight 34 coupled to the hook 38 may be positioned in the hook receiving cavity 26 in the body 12 such that a portion of the hook receiving cavity 26 remains unfilled when the weight 34 is positioned within the hook receiving cavity 26. The weight 34 may be completely enclosed by the body 12.

The weight 34 may be attached to the hook 38 using a variety of attachment mechanisms, such as soldering, tinning, crimping, adhesives, or others, or may be integrally formed with the hook. The weight 34 may be attached to the hook 38 such that a midpoint 35 of the weight 34 is closer to the throat 57 than to the line receiving portion 42 of the hook 38. In this position, the weight 34 may function as a keel when positioned inside the body 12.

The weight 34 may or may not be formed from the same material with which the hook 38 is formed. The weight may be formed from materials such as, but not limited to, lead, tin, tungsten, any combination thereof, and synthetic materials having high densities. The weight 34 may also be formed from numerous sizes such as, but not limited to, about 1/32 of an ounce to about two ounces. In at least one embodiment, the weight 34 may be attached to the hook 38 such that at least a portion of the weight 34 is attached to the bend 46. Attaching the weight 34 to at least a portion of the bend 46 prevents the weight from breaking free of the hook 38 when the lure 10 makes sudden contact with a dock piling or other structure causing the lure 10 to stop abruptly.

The weight 34 may have a shape enabling the hook 38 to remain in the body 12 when the hook 38 is positioned in the hook receiving cavity 26. For instance, the weight 34 may have a width 56, as shown in FIG. 11, that is wider than a width 58 of the hook. In essence, the profile of the weight 34 may be larger than the profile of the hook 38, thereby increasing the resistance of the weight 34 to entering the shank containing cavity 32. The weight 34 may be formed from a first shank section 90 aligned with the shank 36 of the hook 38 and a second bend section 92 that is skewed relative to the first shank section 90. The weight 34 may have a base 94 of the first shank section 90 aligned generally with the shank 36 of the hook 38. The weight 34 may have an hour glass shape with the smaller end closest to the line receiving portion 42.

As previously mentioned, the hook receiving cavity 26 may be configured to contact the weight 34 when the weight 34 is in the hook receiving cavity 26. In addition, the weight 34 may also extend below the hook 38, as shown in FIG. 4. More specifically, in at least one embodiment, a midpoint 35 of the weight 34 may be outside of the hook 38 or, in other words, not in the throat 57 of the hook 38.

The combined weight 34 and hook 38 may be coupled to the body 12 by inserting the shank 36 into the hook receiving cavity 26. In at least one embodiment, the shank 36 may be inserted through an bottom-facing, elongated opening 50 in a bottom surface 52 of the body 12. In other embodiments, the shank 36 may be inserted through a thin layer of material forming the body 12. The shank 36 may then be inserted into the shank containing region 32. In at least one embodiment, a line receiving portion 42 may extend out of a tip 54 of the body 12, as shown in FIG. 3, enabling a line to be attached to the lure 10 using a variety of knots, such as, but not limited to, a loop knot, a uni knot, and others.

During use, the lure 10 may be cast and retrieved through the water to simulate a natural baitfish or crustacean. Positioning the weight 34 in a midsection 28 of the lure 10 enables the lure to maintain an upright attitude while be pulled through the water. In other words, the longitudinal axis 25 of the lure 10 may be generally horizontal when pulled through the water. Further, positioning the weight 34 on the hook 38 so that the weight 34 is able to be positioned in the midsection 28 of the body 12 enables the weight 34 to function as a keel in keeping the body 12 upright in the water. Maintaining the proper attitude of the lure 10 is important in that a lure 10 lacking proper attitude will spook fish rather than entice a strike. Attaching the weight 34 to the hook 38 enables the lure 10 to be cast and retrieved numerous times without the hook being pulled, entirely or partially, from the body 12 through the shank containing region 32. Such configuration is very advantageous in that even slightly pulling the hook into from the body 12 causes the tail 16 of the body 12 to be curved upward, which can induce a spin or other unnatural action when the lured is pulled through the water. Further, the lure 10 may be attacked by numerous fish and used to catch numerous fish before the body 12 has been damaged to a point requiring the body to be exchanged for a new body. The weight 34 and hook 38 combination increases the useful life of the body 12.

It should be understood that the examples and embodiments described herein are for illustrative purposes only and that various modifications or changes in light thereof will be obvious to persons skilled in the art, and that such modifications or changes are to be included within the spirit and purview of this application. Moreover, the invention can take other specific forms without departing from the spirit or essential attributes thereof.

I claim:

1. A fishing lure resembling a shrimp, comprising:
   an elongated body configured to resemble a shrimp and having at least one hook receiving cavity in a midsection of the body, a head, a tail, and a plurality of legs extending from the head;
   wherein the at least one hook receiving cavity is defined by a first laterally extending sidewall, extending in a direction from the head towards the tail, forming part of a first side of the elongated body of the lure and a second laterally extending sidewall, extending in a direction from the head towards the tail, forming part of a second side of the elongated body of the lure, wherein an outer surface of the first sidewall faces in a opposite direction from an outer surface of the second sidewall;
   wherein the at least one hook receiving cavity is further defined by a bottomwall extending in a direction from head to tail,
   wherein a shank containing cavity extends between said at least one hook receiving cavity and a tip of the lure's head,
   wherein a weight receiving pocket is longitudinally aligned with the shank containing cavity,
   wherein the at least one hook receiving cavity is sized to allow insertion of a shank of a hook into the shank containing cavity but also restricts insertion of a weight attached to the hook's shank into the shank containing cavity;
   wherein the at least one hook receiving cavity includes a bottom-facing, elongated opening, wherein the weight receiving pocket is formed at least in part by the bottomwall and is positioned in the head of the elongated body and proximate to the legs extending from the head, wherein at least a portion of the legs extend from the bottomwall and wherein the weight receiving pocket is positioned closer to a tip of the head of the elongated body than the bottom-facing, elongated opening;
   wherein the at least one hook receiving cavity includes the bottom-facing, elongated opening at least partially in the midsection of the body,
   wherein the bottom-facing, elongated opening extends from a rearward edge of the bottomwall defining a portion of the at least one hook receiving cavity to tailwardmost point of the bottom-facing, elongated opening;
   a hook having a weight coupled to the hook along a shank of the hook such that the weight is positioned along at least a portion of the shank of the hook and a line receiving portion of the hook extends from the head of the body;
   wherein the hook is positioned in the at least one hook receiving cavity such that at least a portion of the weight contacts inner surfaces of the at least one hook receiving cavity thereby resisting the hook from being pulled from the body when the hook is pulled at a line receiving portion of the hook;
   wherein the weight coupled to the hook is positioned in the at least one hook receiving cavity in the body such that a portion of the at least one hook receiving cavity remains unfilled when the weight is positioned within the at least one hook receiving cavity; and
   wherein a forward endwall forming a portion of the at least one hook receiving cavity prevents the weight from being pulled into the body toward the head of the lure.

2. The fishing lure of claim 1, further comprising a support backbone of the body having a generally consistent thickness throughout the head and midsection of the body.

3. The fishing lure of claim 1, wherein the support backbone of the body extends from the head to the tail.

4. The fishing lure of claim 1, wherein the first and second sidewalls forming the at least one hook receiving cavity are flexible and have a combined thickness less than a width of the bottom-facing, elongated opening.

5. The fishing lure of claim 1, wherein the weight coupled to the hook is positioned in the at least one hook receiving cavity in the body such that a midpoint of the weight is proximate to a midpoint of the lure such that a longitudinal axis of the lure is generally horizontal when the lure is in water to resemble the natural attitude of a shrimp.

6. The fishing lure of claim 1, wherein the weight is coupled to the hook such that a midpoint of the mass of the weight is positioned closer to a throat of the hook than to a line receiving portion of the hook.

7. The fishing lure of claim 1, wherein the weight is formed from a first shank section aligned with a shank of the hook and a second bend section that is skewed relative to the first shank section.

8. The fishing lure of claim 1, wherein the weight has a base of the first shank section aligned generally with the shank of the hook that extends wider than a width of the hook.

9. The fishing lure of claim 1, wherein the weight is positioned in the body such that a center of mass of the body substantially at a midpoint of the body and wherein the weight is completely enclosed by the body.

10. The fishing lure of claim 1, wherein at least a portion of the weight is coupled to a bend of the hook and wherein the weight is formed from materials selected from the group consisting of lead and tin.

11. The fishing lure of claim 10, wherein the tail is generally triangularly shaped.

12. The fishing lure of claim 11, wherein the first and second sidewalls each have a thickness that is less than a width of the bottom-facing, elongated opening of the at least one hook receiving cavity.

13. The fishing lure of claim 11, wherein the weight coupled to the hook such that a midpoint of the mass of the weight is positioned closer to a throat of the hook than to a line receiving portion of the hook.

14. The fishing lure of claim 11, wherein the weight is formed from a first shank section aligned with a shank of the hook and a second bend section that is skewed relative to the first shank section.

15. The fishing lure of claim 11, wherein the weight has a base of the first shank section aligned generally with the shank of the hook that extends wider than a width of the hook.

16. The fishing lure of claim 11, wherein the weight is positioned in the body such that a center of mass of the body is nearly at a midpoint of the body.

17. The fishing lure of claim 11, wherein the weight is completely enclosed by the body and wherein at least a portion of the weight is coupled to a bend of the hook.

18. A fishing lure resembling a shrimp, comprising:

an elongated body configured to resemble a shrimp and having at least one hook receiving cavity in a midsection of the body, a head, a tail, and a plurality of legs extending from the head;

wherein the at least one hook receiving cavity is defined by a first laterally extending sidewall, extending in a direction from the head towards the tail, forming part of a first side of the elongated body of the lure and a second laterally extending sidewall, extending in a direction from the head towards the tail, forming part of a second side of the elongated body of the lure, wherein an outer surface of the first sidewall faces in a opposite direction from an outer surface of the second sidewall;

wherein the first and second sidewalls forming the at least one hook receiving cavity are flexible;

wherein the at least one hook receiving cavity is further defined by a bottomwall extending in a direction from head to tail, wherein a shank containing cavity extends between said at least one hook receiving cavity and a tip of the lure's head, wherein a weight receiving pocket is longitudinally aligned with the shank containing cavity, wherein the at least one hook receiving cavity is sized to allow insertion of a shank of a hook into the shank containing cavity but also restricts insertion of a weight attached to the hook's shank into the shank containing cavity;

wherein the at least one hook receiving cavity includes a bottom-facing, elongated opening, wherein the weight receiving pocket is formed at least in part by the bottomwall and is positioned in the head of the elongated body and proximate to the legs extending from the head, wherein at least a portion of the legs extend from the bottomwall and wherein the weight receiving pocket is positioned closer to a tip of the head of the elongated body than the bottom-facing, elongated opening;

wherein the at least one hook receiving cavity includes the bottom-facing, elongated opening at least partially in the midsection of the body, wherein the bottom-facing, elongated opening extends from a rearward edge of the bottomwall defining a portion of the at least one hook receiving cavity to tailwardmost point of the bottom-facing, elongated opening;

a hook having a weight coupled to the hook along a shank of the hook such that the weight is positioned along at least a portion of the shank of the hook and a line receiving portion of the hook extends from the head of the body;

wherein the hook is positioned in the at least one hook receiving cavity such that at least a portion of the weight contacts inner surfaces of the at least one hook receiving cavity thereby resisting the hook from being pulled from the body when the hook is pulled at a line receiving portion of the hook;

wherein the weight coupled to the hook is positioned in the at least one hook receiving cavity in the body such that a portion of the at least one hook receiving cavity remains unfilled when the weight is positioned within the at least one hook receiving cavity;

wherein the weight coupled to the hook is positioned in the at least one hook receiving cavity in the body such that a midpoint of the weight is proximate to a midpoint of the lure such that a longitudinal axis of the lure is generally horizontal when the lure is in water to resemble the natural attitude of a shrimp;

wherein a forward endwall forming a portion of the at least one hook receiving cavity prevents the weight from being pulled into the body toward the head of the lure; and a shank containing cavity extending between the at least one hook receiving cavity and the tip of the head of the lure and sized to allow a shank of the hook to be inserted into the shank containing cavity but to restrict the weight from being inserted into the shank containing cavity.

* * * * *